(12) United States Patent
Takamura et al.

(10) Patent No.: US 11,173,820 B2
(45) Date of Patent: Nov. 16, 2021

(54) HEADREST, VEHICLE SEAT AND VEHICLE

(71) Applicant: HONDA MOTOR CO., LTD., Tokyo (JP)

(72) Inventors: Yuki Takamura, Saitama (JP); Katsutoshi Noguchi, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/742,183

(22) Filed: Jan. 14, 2020

(65) Prior Publication Data

US 2021/0213859 A1 Jul. 15, 2021

(51) Int. Cl.
*A61G 15/00* (2006.01)
*A47C 7/36* (2006.01)
*A47C 1/10* (2006.01)
*B60N 2/80* (2018.01)

(52) U.S. Cl.
CPC .......... *B60N 2/80* (2018.02); *B60N 2002/899* (2018.02)

(58) Field of Classification Search
CPC .... A47C 7/38; B60N 2002/022; B60N 2/856; B60N 2/882; B60N 2/143; B60N 2/80; B60N 2002/899; B60R 21/026
See application file for complete search history.

(56) References Cited

U.S. PATENT DOCUMENTS

| | | | | |
|---|---|---|---|---|
| 4,738,809 A * | 4/1988 | Storch | ................... | B29C 33/126 249/91 |
| 5,165,754 A * | 11/1992 | Louys | .................... | B60N 2/809 297/391 |
| 5,405,190 A * | 4/1995 | Jeffcoat | .................... | B60N 2/80 297/391 |
| 5,927,814 A * | 7/1999 | Yoshimura | ............... | B60N 2/80 297/391 |
| 5,967,612 A * | 10/1999 | Takei | .................... | B60N 2/5891 297/391 |
| 5,984,414 A * | 11/1999 | Adachi | ............... | B29C 44/1257 297/391 |
| 6,012,753 A * | 1/2000 | Ordoyne | ............... | B60R 21/026 119/496 |
| 6,056,358 A * | 5/2000 | De Filippo | ............ | B60N 2/809 297/220 |
| 6,164,226 A * | 12/2000 | Takei | .................... | B60N 2/5883 112/475.06 |
| D460,279 S * | 7/2002 | Moburg | ......................... | D6/356 |
| 6,499,805 B1 * | 12/2002 | Watadani | ............. | B60N 2/5841 297/408 |
| 6,637,822 B1 * | 10/2003 | Kato | ........................ | B60N 2/80 297/397 |
| 6,893,095 B2 * | 5/2005 | Schambre | ............... | B60N 2/856 297/406 |
| 7,367,603 B2 * | 5/2008 | Adachi | .................... | B60N 2/80 296/63 |

(Continued)

FOREIGN PATENT DOCUMENTS

JP 61-63950 U 5/1986
JP 2-82948 U 6/1990

*Primary Examiner* — Shin H Kim

(74) *Attorney, Agent, or Firm* — Westerman, Hattori, Daniels & Adrian, LLP

(57) ABSTRACT

A headrest disposed in an upper portion of a seat of a vehicle is configured such that a plurality of through holes are arranged in a vertical direction, the through holes extending through the headrest in a horizontal and front-rear direction.

15 Claims, 4 Drawing Sheets

(56) References Cited

U.S. PATENT DOCUMENTS

| | | | | |
|---|---|---|---|---|
| 7,537,282 | B2* | 5/2009 | Veine | B60N 2/888 |
| | | | | 297/216.12 |
| 7,651,154 | B1* | 1/2010 | Huelke | B60N 2/882 |
| | | | | 296/187.01 |
| 10,112,570 | B2* | 10/2018 | Barbat | B60N 2/143 |
| 10,252,688 | B2* | 4/2019 | Szawarski | B60N 2/002 |
| 2003/0214168 | A1* | 11/2003 | Schambre | B60N 2/856 |
| | | | | 297/391 |
| 2018/0194317 | A1* | 7/2018 | Barbat | B60N 2/90 |
| 2018/0272977 | A1* | 9/2018 | Szawarski | B60N 2/04 |
| 2019/0225159 | A1* | 7/2019 | Lind | B60N 2/143 |
| 2020/0086820 | A1* | 3/2020 | Gould | B60R 21/215 |
| 2020/0317091 | A1* | 10/2020 | Aktas | B60N 2/0232 |
| 2020/0361349 | A1* | 11/2020 | Line | B60N 2/06 |
| 2020/0406789 | A1* | 12/2020 | Line | B60N 2/3009 |

* cited by examiner

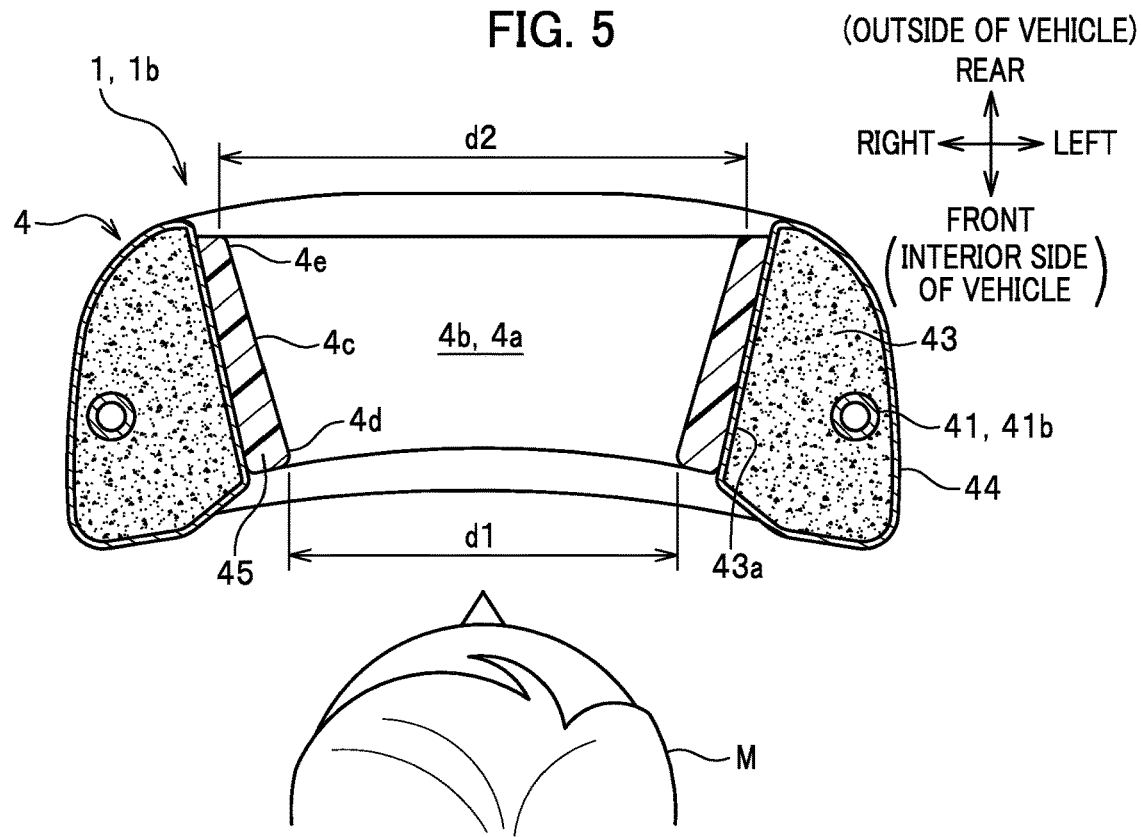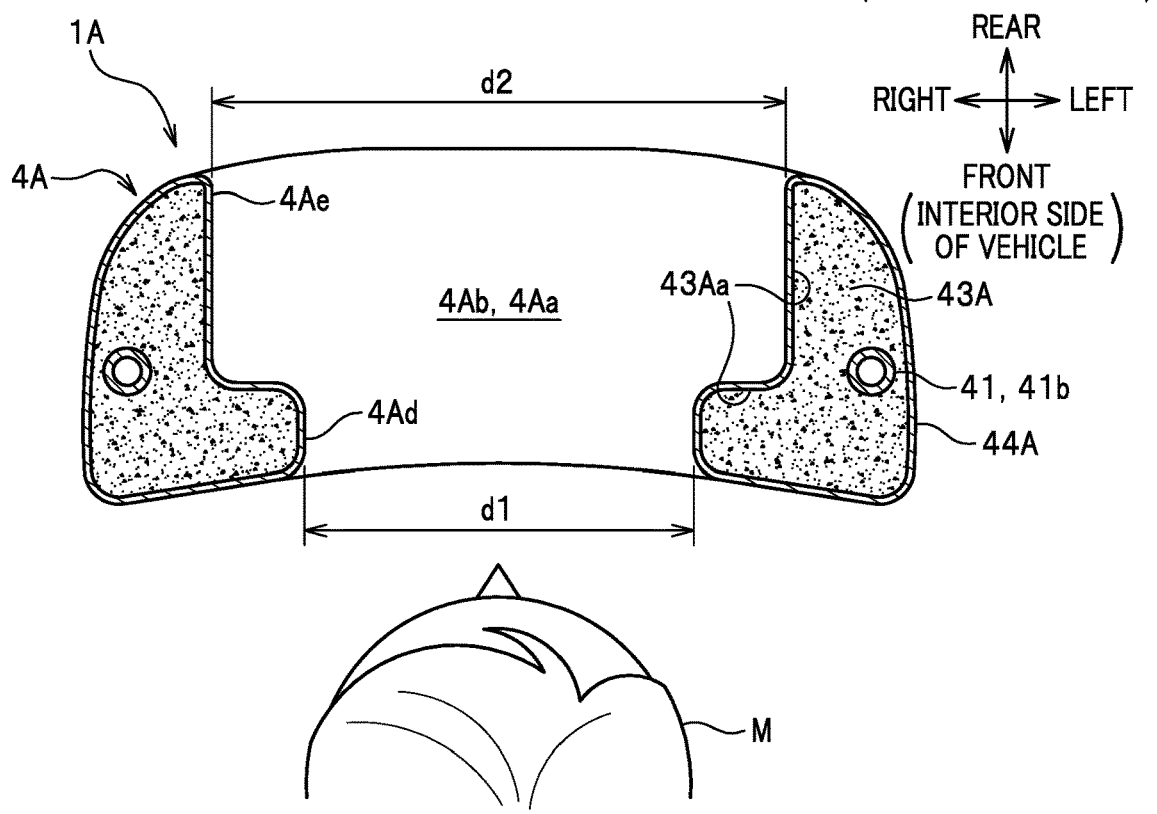

HEADREST, VEHICLE SEAT AND VEHICLE

BACKGROUND OF THE INVENTION

Field of the Invention

The present disclosure relates to a headrest, a vehicle seat and a vehicle.

Description of the Related Art

A holed headrest has been conventionally known, in which a through hole is formed in the headrest to improve a field of rear view of an occupant seated on a front seat and a field of front view of an occupant seated on a rear seat.

A holed headrest 1 disclosed in Japanese Utility Model Publication No. S61-63950 (see FIGS. 1 to 3) includes an outer skin 2, a core metal 3 joined to an upper end of a stay 4, a foamed material 5 wrapping the core metal 3, and a through hole formed in a central portion of the holed headrest 1.

A headrest for an automobile disclosed in Japanese Utility Model Publication No. H02-82948 (see FIGS. 1 to 4) includes a cushion material 4 having a through hole 1 at a central portion thereof, an outer skin 7 having window portions 8 at positions opposite to the through hole 1, and transparent plastic window portions 10 sewn around window holes 9.

However, the through hole of the holed headrest 1 disclosed in Japanese Utility Model Publication No. 561-63950 and the through hole 1 formed in the headrest for an automobile disclosed in Japanese Utility Model Publication No. H02-82948 are formed of a single hole extending through the headrest in the front-rear direction and having a horizontally oriented rectangular shape.

An automobile headrest with a holed headrest 1 disclosed in Japanese Utility Model Publication No. 561-63950 and an automobile headrest with a through hole 1 disclosed in Japanese Utility Model Publication No. H02-82948 have a relatively large hole in the central portion. Therefore, there is a room to further improve the strength of the automobile headrest against impact applied from a side thereof.

In view of the above, the present disclosure has been invented to overcome the above-described drawback, and an aspect of the present disclosure is to provide a headrest in which the strength against side impact is improved, a vehicle seat and a vehicle.

SUMMARY OF THE INVENTION

To overcome the above-described drawback, the present disclosure proposes a headrest disposed in an upper portion of a seat of a vehicle, the headrest comprising a plurality of through holes arranged in a vertical direction, the through holes extending through the headrest in a horizontal and front-rear direction.

BRIEF DESCRIPTION OF THE DRAWINGS

FIG. 5 is a sectional view taken along the line V-V of FIG. 3.

FIG. 6 is an enlarged transverse section of a headrest according to a modification of the embodiment.

DETAILED DESCRIPTION OF THE PREFERRED EMBODIMENT

With reference to FIGS. 1 to 5, a headrest 4, a vehicle seat (seat 1) and a vehicle according to one embodiment are described below by way of example.

In this embodiment, a "front" direction corresponds to a forward direction of the vehicle, a "rear" direction corresponds to a backward direction of the vehicle, and a vehicle width direction designates a "right-left" direction.

<<Vehicle>>

Figure 1:
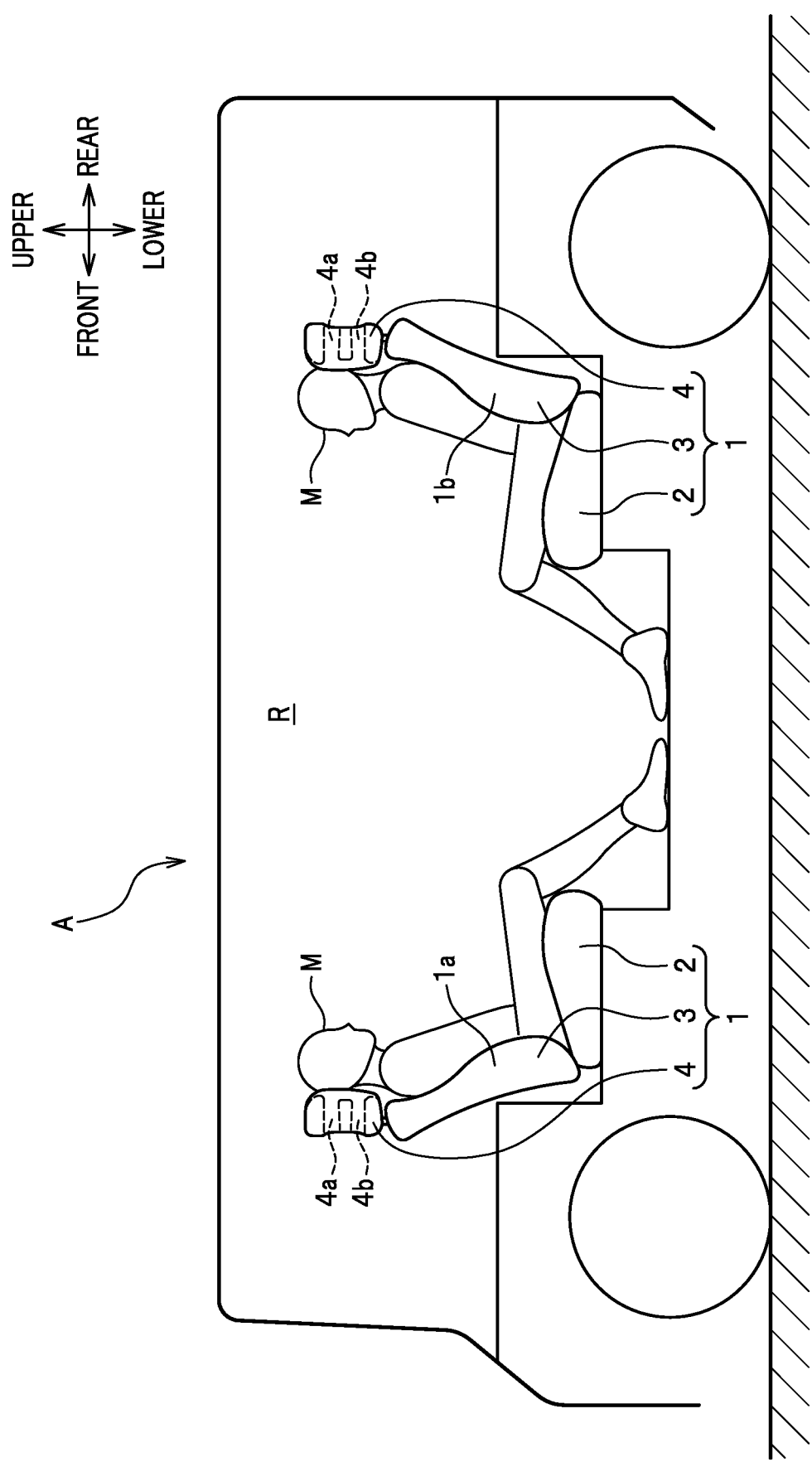
FIG. 1 is a schematic view showing headrests, vehicle seats and a vehicle according to one embodiment.

As seen in FIG. 1, a vehicle is of any type as long as a seat 1 having a headrest 4 is provided on a vehicle. The kind of vehicle, the type of vehicle, the number of seats 1 mounted on the vehicle, the arrangement position of the seat 1, the kind of the seat 1 and the like are not limited to specific ones. As an example of the vehicle, a self-driving car (automobile A) that can automatically run without requiring a driver is described below by way of example.

The automobile A has a vehicle body generally in the shape of a rectangle extending long in a longitudinal direction (front-rear direction) when viewed from above. The automobile A is a four-wheeled vehicle with wheels at front, rear, right and left sides. A relatively large window (not shown) is provided on each of front, rear, right and left sides of the automobile A. A passenger compartment R is provided at a central portion of the automobile A. Seats 1 are arranged respectively on the front part and on the rear part of the passenger compartment R. As an example of the automobile A, a description is given to a six-seater car in which seats 1 are arranged face-to-face on the front part and on the rear part of the passenger compartment R.

<<Seat>>

The seat 1 according to this embodiment may be an occupant seat at least including a headrest 4. As seen in FIG. 1, the seat 1 includes, for example, a front seat 1a and a rear seat 1b which constitute a pair of face-to-face type seats arranged opposite to each other. The front seat 1a and the rear seat 1b are symmetrically arranged occupant seats having symmetrical shapes with each other.

In the following description, the rear seat 1b is mainly described in detail and the explanation of the front seat 1a is left out where appropriate.

Figure 2:
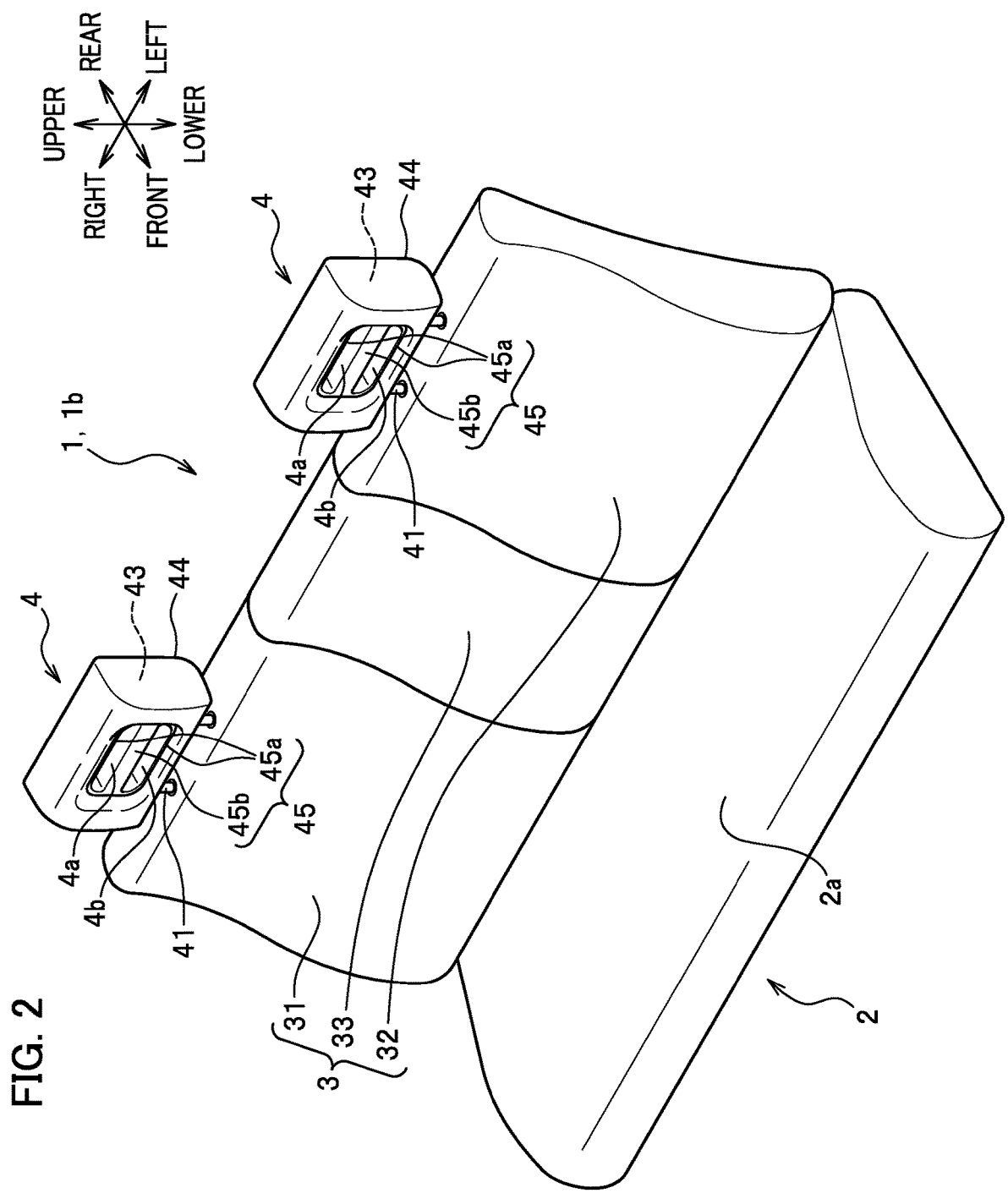
FIG. 2 is a perspective view showing a seat arranged on a rear side.

As seen in FIG. 2, the seat 1 is a bench seat, for instance. The seat 1 includes a seat cushion 2, a seat back 3, and a headrest 4. Further, the seat 1 may include seat rails (not shown) that allow the seat cushion 2 to be mounted slidably in the front-rear direction relative to the vehicle body, and a tilt mechanism (not shown) that joins the seat back 3 to the seat cushion 2 to allow the seat back 3 to be reclined relative to the seat cushion 2.

<<Seat Cushion>>

The seat cushion 2 is a member for supporting an occupant M (seated person) from buttocks to thighs of the occupant M (see FIG. 1). For example, the seat cushion 2 is formed as a bench seat and has a seating surface 2a on which two occupants M can sit. A metal seat frame (not shown) constituting a framework for supporting the seat cushion 2 is provided in the seat cushion 2.

The seating surface 2a is a surface for supporting an occupant M seated on the seat 1 (see FIG. 1) at buttocks and thighs of the occupant M. The seating surface 2a is a surface for receiving most of the weight of the occupant M when the occupant M sits on the seat 1. The seating surface 2a is substantially flat in the horizontal direction.

It should be noted that the seat cushion 2 may constitute separate-type seats divided into a right seat and a left seat.

<<Seat Back>>

The seat back 3 is a member for supporting an occupant M from shoulders to the lumbar region of the occupant M (see FIG. 1). In other words, the seat back 3 is a supporting member for supporting the back of the occupant M (see FIG. 1). The seat back 3 includes, for example, a right-side seat back portion 31 disposed rightward of the seat back 3, a left-side seat back portion 32 disposed leftward of the seat back 3, and a central armrest portion 33 disposed at a central portion of the seat back 3. Further, a pair of generally cylindrical-shaped stay holders (not shown) fixed to a frame member (not shown) are provided in the upper inner portion of the seat back 3.

Next, the internal structure of the seat cushion 2 and the seat back 3 are described. It should be noted that the internal structure of the seat cushion 2 is substantially the same as the internal structure of the seat back 3.

The seat cushion 2 and the seat back 3 consist mainly of a frame member (not shown) constituting a framework, a pad material (not shown), and an outer skin material (not shown) for covering a surface side of the pad material.

<<Headrest>>

Figure 3:
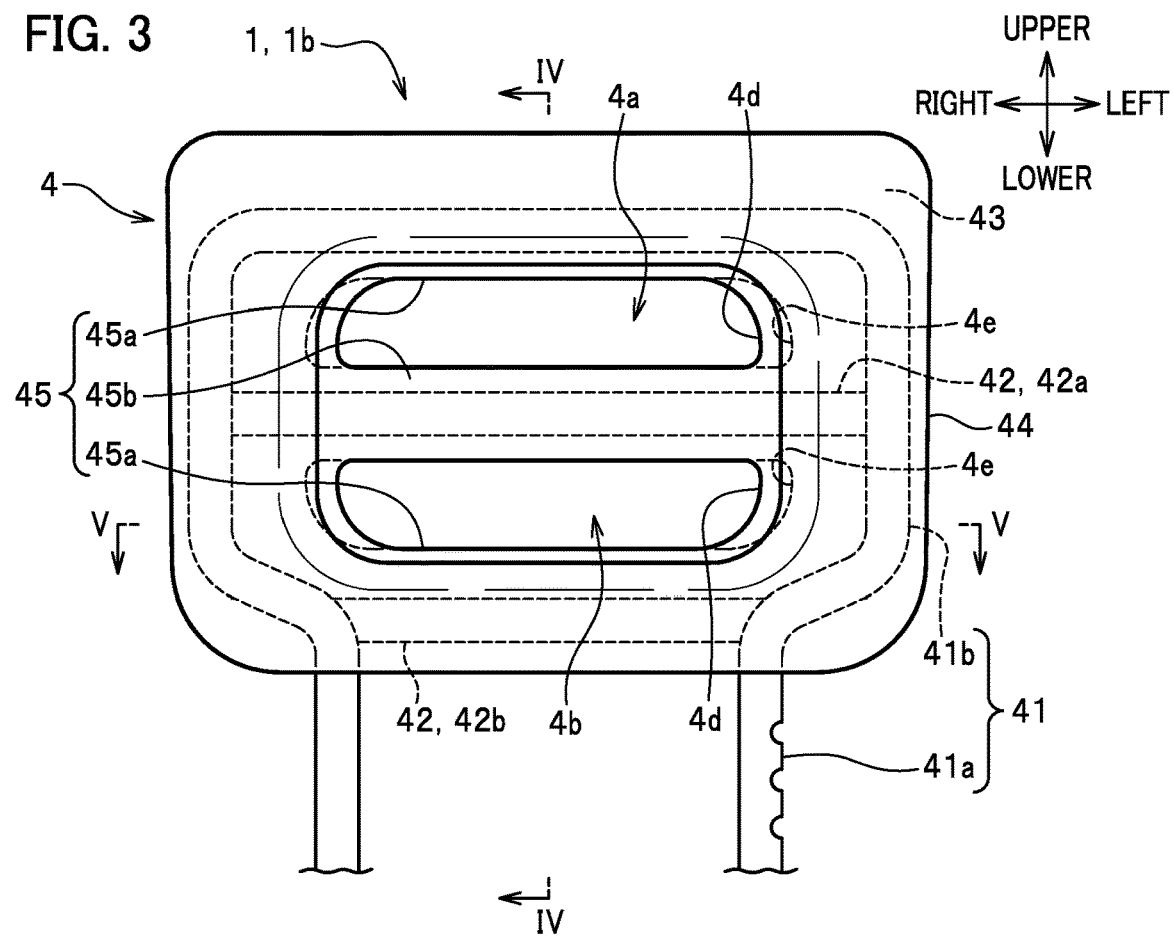
FIG. 3 is an enlarged front view of a headrest of the seat arranged on the rear side.
Figure 4:
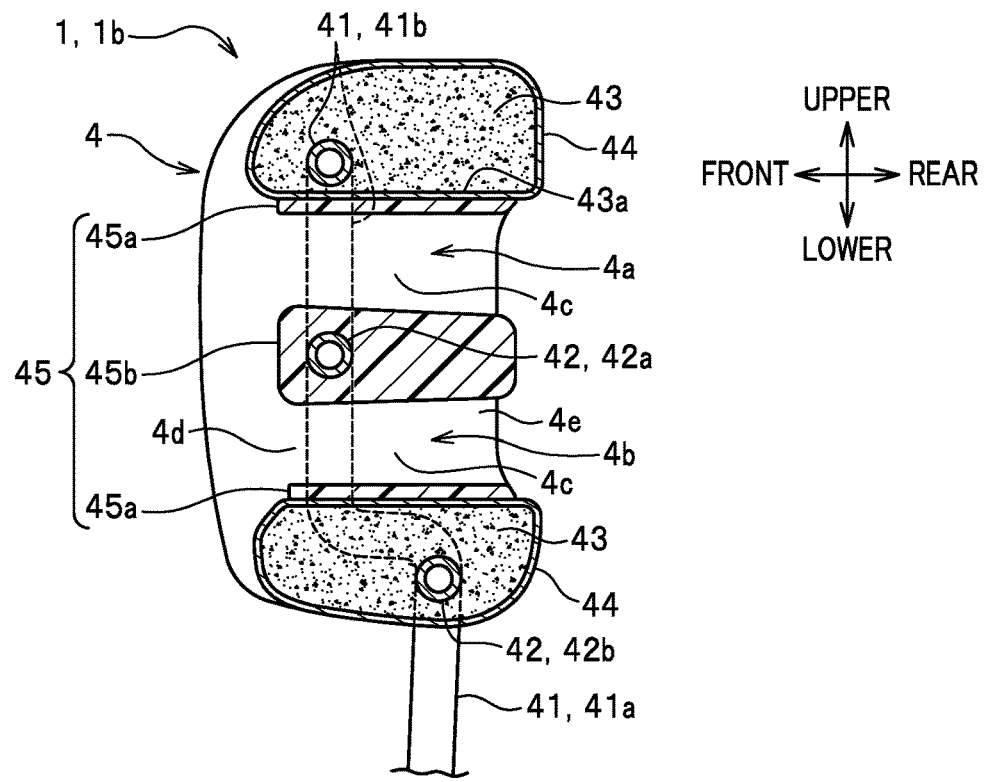
FIG. 4 is a sectional view taken along the line IV-IV of FIG. 3.

The headrest 4 shown in FIG. 2 is a member for supporting the head of an occupant M (see FIG. 1). The headrest 4 is disposed on an upper portion of the right-side seat back portion 31 (seat 1) and on an upper portion of the left-side seat back portion 32 (seat 1). As seen in FIGS. 3 and 4, the headrest 4 includes a stay 41, a reinforcing member 42, a pad material 43, an outer skin material 44, and a frame member 45 having through holes 4a, 4b.

<<Stay>>

The stay 41 is a member for supporting the headrest 4 on the upper portion of the seat back 3 to allow the headrest 4 to be moved upward or downward relative to the seat back 3. The stay 41 has a pair of right and left metal rod members. The stay 41 includes a held portion 41a configured to be inserted into a stay holder (not shown) provided in the seat back portion 31, 32 and to be held so as to be movable in the vertical direction, and a headrest frame portion 41b disposed on the upper end portion of the held portion 41a and continuous from the held portion 41a.

The held portion 41a has a pair of right and left columnar portions extending parallelly from the inner portion of the seat back 3 toward the upper portion of the headrest 4.

The headrest frame portion 41b is a core frame portion constituting a framework of the headrest 4. The headrest frame portion 41b has a generally inverted U-shaped configuration (generally C-shaped configuration) when viewed from the front side. The headrest frame 41b extends from the upper end portion of one held portion 41a to the upper end portion of the other held portion 41a through the inner side of the headrest 4.

<<Reinforcing Member>>

As seen in FIGS. 3 and 4, the reinforcing member 42 is a core member made of a metal rod member for reinforcing the headrest 4 and the headrest frame portion 41b. The reinforcing member 42 includes a through-hole reinforcing portion 42a provided between the through holes 4a, 4b of the headrest 4, and a headrest-lower-side reinforcing portion 42b provided on the lower side of the headrest 4. The reinforcing member 42 is disposed inside the pad material 43 and serves as a framework of the headrest 4.

It should be noted that the stay 41 and the reinforcing member 42 are integrally formed of a single member.

The through-hole reinforcing portion 42a is welded to and bridges between right and left inner side surfaces of the headrest frame portion 41b that is bent into an inverted U-shaped configuration.

The headrest-lower-side reinforcing portion 42b is welded to and bridges between the right upper end portion and the left upper end portion of the held portion 41a of the stay 41. The through-hole reinforcing portion 42a is joined to the headrest frame portion 41b such that a horizontally oriented rectangle is formed in the headrest 4 by the through-hole reinforcing portion 42a and the headrest frame portion 41b. As a result, the through-hole reinforcing portion 42a can reinforce the headrest frame portion 41b to improve the strength of the headrest 4 against side impact.

<<Pad Material>>

The pad material 43 is made of a flexible member having a rectangular annular shape (generally rectangular shape) when viewed from the front side. A frame-member installation hole 43a is formed in a central portion of the pad material 43; when viewed from the front side, the frame-member installation hole 43a is a long hole generally in the shape of a horizontally oriented rectangle. The pad material 43 is made of a soft member such as urethane pad.

As seen in FIGS. 4 and 5, the frame-member installation hole 43a is a hole used for attaching the frame member 45 to the headrest 4. As shown in FIG. 4, the frame-member installation hole 43a is formed in the central portion of the pad material 43 to extend horizontally in the front-rear direction. Similar to the through holes 4a, 4b having a tapered shape, as shown in FIG. 5, the frame-member installation hole 43a is a hole having a tapered shape such that an area of the hole increases from the interior side (front side) of the vehicle toward the outside (rear side) of the vehicle.

<<Outer Skin Material>>

The outer skin material 44 is a member for covering the outer surface of the pad material 43. The outer skin material 44 is adhered to the outer surface of the pad material 43 by heat. As an alternative, the outer skin material 44 is a bag member formed by sewing a plurality of cloths (fabrics), and is sewn against the outer surface of the pad material 43. The outer skin material 44 may be made of leather or synthetic leather, for instance, other than fabrics made of chemical fibers, synthetic fibers or the like.

<<Frame Member>>

The frame member 45 is inserted into the frame-member installation hole 43a of the pad material 43 that is covered by the outer skin material 44. The frame member 45 consists of a member in which two through holes 4a, 4b are arranged in the vertical direction. The frame member 45 includes a frame portion 45a having a horizontally oriented rectangular frame shape, and a dividing portion 45b for dividing the frame portion 45a into two halves arranged in the vertical direction. The frame member 45 is made, for example, of synthetic resin.

The outer exposed surface of the frame member 45 inserted into the frame-member installation hole 43a may be covered with and adhered to the outer skin material 44 that is adhered to the outer surface of the pad material 43.

As seen in FIG. 3, the frame portion 45a is a plate member generally in the shape of a rectangle (horizontally oriented rectangle) when viewed from the front side; the frame portion 45a is inserted into the frame-member installation hole 43a. As shown in FIG. 4, the upper and lower portions of the frame portion 45a are flat and are arranged horizontally in the front-rear direction. As shown in FIG. 5, the right and left portions of the frame portion 45a are formed such that the distance therebetween increases from the front side toward the rear side.

As seen in FIG. 4, the dividing portion 45b is arranged to extend across the frame portion 45a between the left side end center and the right side end center of the frame portion 45a. The dividing portion 45b is formed as a thickened horizontal plate. The through-hole reinforcing portion 42a is provided in the dividing portion 45b along the center line of the dividing portion 45b. Therefore, the dividing portion 45b is strong in its strength and serves as a reinforcing portion for reinforcing the headrest 4.

<<Through Holes>>

The through holes 4a, 4b are holes arranged in the vertical direction and extending through the headrest 4 in the horizontal and front-rear direction. As seen in FIG. 5, the through holes 4a, 4b have an open-side end portion 4d at a seating surface 2a side (front side) of the seat 1 (see FIG. 2), and an open-side end portion 4e at an opposite side (rear side) of the seat 1 that is opposite to the seating surface 2a. The through holes 4a, 4b are formed such that the inner width d2 (width dimension) of the open-side end portion 4e at the opposite side is larger than the inner width d1 (width dimension) of the open-side end portion 4d at the seating surface 2a side. The through holes 4a, 4b have a tapered transverse cross-sectional shape gradually increasing from the front side toward the rear side.

In other words, the through holes 4a, 4b have a tapered shape such that the distance between sides in the vehicle width direction increases from the seating surface 2a side toward the opposite side. For this reason, the through holes 4a, 4b are formed longer in the horizontal direction than in the vertical direction when viewed from the front side. It should be noted that the number of through holes 4a, 4b may be two ore more as long as a plurality of through holes are formed.

It should be noted that as shown in FIG. 1, the rear-facing front seat 1a has the through holes 4a, 4b of which directions are opposite to those indicated in FIG. 5; therefore, the rear side of FIG. 5 designates the front side of the through holes 4a, 4b, whereas the front side of FIG. 5 designates the rear side of the through holes 4a, 4b. In this instance, the through holes 4a, 4b are formed such that the inner width d2 of the open-side end portion 4e at the opposite side (front side) that is opposite to the seating surface 2a is larger than the inner width d1 of the open-side end portion 4d at the seating surface 2a side (rear side) of the seat 1. Accordingly, the through holes 4a, 4b are formed such that when an occupant M looks ahead of the vehicle through the through holes 4a, 4b, the field of view of the occupant M can be extended in the frontward direction.

<<Operations of Headrest, Vehicle Seat and Vehicle>>

Next, with reference to FIGS. 1 to 5, operations of a headrest 4, a vehicle seat (seat 1) and a vehicle (automobile A) according to this embodiment are described below.

As seen in FIG. 3, the headrest 4 has the headrest frame portion 41b formed to have an inverted U-shaped configuration when viewed from the front side, and the through-hole reinforcing portion 42a extending in the vehicle width direction bridges and is welded to the central portion of the headrest frame portion 41b. Further, at the lower side of the headrest frame portion 41b, the headrest-lower-side reinforcing portion 42b extending in the vehicle width direction bridges and is welded to the held portion 41a of the stay 41. Accordingly, the headrest 4 is reinforced by the headrest frame portion 41b, the through-hole reinforcing portion 42a, and the headrest-lower-side reinforcing portion 42b. This can enhance the strength against a side-impact collision and prevent the headrest 4 from collapsing even if a load in the vehicle width direction is applied to the headrest 4 during a side-impact collision.

Further as seen in FIG. 1, the seats S (front seat 1a and rear seat 1b) are arranged opposite to each other within the passenger compartment R. An occupant M seated on the front seat 1a can look behind the vehicle through the through holes 4a, 4b formed in the headrest 4 of the rear seat 1b when no occupant M sits on the rear seat 1b.

Further, an occupant M seated on the rear seat 1b can look ahead of the vehicle through the through holes 4a, 4b formed in the headrest 4 of the front seat 1a when no occupant M sits on the front seat 1b.

As seen in FIG. 2, the seat 1 has headrests 4 attached to the right-side seat back portion 31 and the left-side seat back portion 32 of the seat back 3 of a three-passenger bench seat. When two occupants M sit on both sides of the three-passenger bench seat 1, a space is formed between the right and left headrests 4, so that a wide field of view is ensured in the front-rear direction and a good visibility is offered in the forward direction and the rearward direction of the vehicle.

Further, as shown in FIG. 5, when an occupant M seated on the rear seat 1b turns around to look behind the vehicle through the through holes 4a, 4b of the headrest 4 of the rear seat 1b, the field of rear view of the occupant M is wide because the through holes 4a, 4b have a tapered portion 4c gradually extending wider toward the rearward direction.

Further, when an occupant M seated on the front seat 1a shown in FIG. 1 turns around to look ahead of the vehicle through the through holes 4a, 4b of the headrest 4 of the front seat 1a, the field of front view of the occupant M is wide because the through holes 4a, 4b have a tapered portion 4c gradually extending wider toward the frontward direction.

Although the rear seat 1b has been described mainly by way of example in this embodiment, the front seat 1a can operate similarly to the rear seat 1b.

As described above, the range of the field of view of the occupant M (seated person) can be extended in the outside direction of the vehicle because the seat 1 has the through holes 4a, 4b formed in the headrest 4 and the through holes 4a, 4b have a tapered transverse cross-sectional shape gradually increasing toward the outer side of the vehicle. As a result, the through holes 4a, 4b can improve the visibility of the occupant M (seated person) outside the vehicle. This makes it easier for the occupant M to look outside the vehicle, thereby contributing to preventing a collision of the automobile A.

As seen in FIGS. 1 to 4, the present disclosure relates to a headrest 4 disposed in an upper portion of a seat 1 of an automobile A (vehicle), wherein the headrest 4 includes a plurality of through holes 4a, 4b arranged in the vertical direction, the through holes 4a, 4b extending through the headrest 4 in the horizontal and front-rear direction.

According to this configuration, since the headrest 4 has a plurality of through holes 4a, 4b extending through the headrest 4 in the horizontal and front-rear direction, an occupant M can look outside the vehicle through the through holes 4a, 4b, so that the visibility of the occupant M outside the vehicle can be improved. Further, since the plurality of through holes 4a, 4b are divided and arranged in the vertical direction, the strength of the headrest 4 against side impact (side-impact collision) can be improved.

Further, as seen in FIG. 2 or 5, the through holes 4a, 4b are formed such that the inner width d2 at the opposite side that is opposite to the seating surface 2a side of the seat 1 is larger than the inner width d1 at the seating surface 2a side of the seat 1.

According to this configuration, since the through holes 4a, 4b of the headrest 4 are formed such that the inner width d2 (width dimension) at the opposite side that is opposite to the seating surface 2a is larger than the inner width d1 (width dimension) at the seating surface 2a side, when a seated person (occupant M) looks outside the vehicle through the through holes 4a, 4b, the field of view of the seated person is wide. For this reason, the headrest 4 according to the present disclosure makes the field of view of the seated person wider in the frontward direction or the rearward direction by the extent to which the through holes 4a, 4b are enlarged from the seating surface 2a toward the opposite side opposite to the seating surface 2a, and can improve the visibility outside the vehicle.

Further, as seen in FIG. 5, the through holes 4a, 4b have a tapered shape such that the distance between sides in the vehicle width direction increases from the seating surface 2a side toward the opposite side.

According to this configuration, since the through holes 4a, 4b of the headrest 4 are formed such that the distance between sides in the vehicle width direction increases from the seating surface 2a side toward the opposite side, when a seated person (occupant M) looks frontward or rearward through the through holes 4a, 4b, the field of view of the seated person is wide. The field of view of the seated person is wider in the frontward direction or in the rearward direction by the extent to which the through holes 4a, 4b are enlarged due to the tapered shape.

As seen in FIGS. 3 to 5, the reinforcing member 42 is provided between the through holes 4a, 4b of the headrest 4.

According to this configuration, since the headrest 4 includes the reinforcing member 42 provided between the through holes 4a, 4b, the headrest 4 can be reinforced as a whole to prevent the headrest 4 from collapsing when a load is applied to the headrest 4.

Further, as seen in FIG. 2, the present disclosure also relates to a vehicle seat comprising a headrest 4, wherein the seat 1 is a bench seat.

According to this configuration, since the seat 1 is a bench seat without a gap between seats, a seated occupant M can move easily in the vehicle width direction. Therefore, when the occupant M looks outside the vehicle through the through holes 4a, 4b of the headrest 4, the occupant M moves his/her head or body in the vehicle width direction. This can easily extend the range of the field of view of the occupant M in the horizontal direction, and thus improve the visibility outside the vehicle.

Further, as seen in FIGS. 1 to 4, the vehicle seat according to the present disclosure comprises a plurality of headrests 4, wherein all of the plurality of headrests 4 have a plurality of through holes 4a, 4b arranged in the vertical direction, the through holes 4a, 4b extending through the headrest 4 in the horizontal and front-rear direction.

According to this configuration, since all of the plurality of headrests 4 have a plurality of through holes 4a, 4b extending through the headrest 4 in the horizontal and front-rear direction, an occupant M can look outside the vehicle through the through holes 4a, 4b of all the headrests 4. Accordingly, the visibility outside the vehicle can be improved further. Further, since all the headrests 4 have a plurality of through holes 4a, 4b divided and arranged in the vertical direction, the strength of the headrests 4 against side impact (side-impact collision) can be improved.

Further, as seen in FIG. 1, the present disclosure relates to a vehicle seat comprising the headrest 4, wherein the seat 1 is a pair of face-to-face type seats arranged opposite to each other.

According to this configuration, an occupant M seated on the front seat 1 (vehicle seat) of the pair of face-to-face type seats can look behind the vehicle through the through holes 4a, 4b formed in the headrest 4 of the rear seat 1. Further, an occupant M seated on the rear seat 1 of the pair of face-to-face type seats can look ahead of the vehicle through the through holes 4a, 4b formed in the headrest 4 of the front seat 1. Accordingly, the visibility outside the vehicle can be improved further in the case of a face-to-face type seat.

Further, since the seat 1 includes a pair of face-to-face type seats, a space between the front seat 1a and the rear seat 1b is enlarged to ensure a baggage storage space, so that more baggage can be loaded.

Further, as seen in FIG. 1, a vehicle (automobile A) according to the present disclosure comprises a seat 1 (front seat 1a) arranged frontward in the traveling direction of the vehicle and a seat 1 (rear seat 1b) arranged rearward in the traveling direction of the vehicle, the front seat 1a and the rear seat 1b facing each other, wherein the rear seat 1b includes a headrest 4 disposed in the upper portion of the rear seat 1b, and the headrest 4 has a plurality of through holes 4a, 4b arranged in the vertical direction, the through holes 4a, 4b extending through the headrest 4 in the horizontal and front-rear direction.

According to this configuration, since the vehicle includes the headrest 4 of the rear seat 1b, in which a plurality of through holes 4a, 4b arranged in the vertical direction are formed to extend through the headrest 4 in the horizontal and front-rear direction, an occupant M seated on the front seat 1a can look outside the vehicle through the through holes 4a, 4b formed in the headrest 4 of the rear seat 1b. Accordingly, the visibility outside the vehicle can be improved further. Further, since the headrest 4 of the rear seat 1b has a plurality of through holes 4a, 4b divided and arranged in the vertical direction, the strength of the headrest 4 against side impact (side-impact collision) can be improved.

Further, as seen in FIG. 1, a vehicle (automobile A) according to the present disclosure comprises a seat 1 (front seat 1a) arranged frontward in the traveling direction of the vehicle and a seat 1 (rear seat 1b) arranged rearward in the traveling direction of the vehicle, the front seat 1a and the rear seat 1b facing each other, wherein the front seat 1a includes a headrest 4 disposed in the upper portion of the front seat 1a, and the headrest 4 has a plurality of through holes 4a, 4b arranged in the vertical direction, the through holes 4a, 4b extending through the headrest 4 in the horizontal and front-rear direction.

According to this configuration, since the vehicle includes the headrest 4 of the front seat 1a, in which a plurality of through holes 4a, 4b arranged in the vertical direction are formed to extend through the headrest 4 in the horizontal and front-rear direction, an occupant M seated on the rear seat 1b can look outside the vehicle through the through holes 4a, 4b formed in the headrest 4 of the front seat 1a. Accordingly, the visibility outside the vehicle can be improved further. Further, since the headrest 4 of the front seat 1a has a plurality of through holes 4a, 4b divided and arranged in the vertical direction, the strength of the headrest 4 against side impact (side-impact collision) can be improved.

<Modification>

The present disclosure is not limited to the above-described embodiment, and various modifications and/or changes may be made without departing from the scope of the technical idea. The present disclosure, of course, covers inventions having been modified and/or changed accordingly. Components previously described in the above-described embodiment are denoted by the same reference numerals, and detailed description thereof will be omitted.

FIG. 6 is an enlarged transverse section of a headrest 4A according to a modification of the embodiment.

According to the above-described embodiment, as seen in FIGS. 2 to 5, the through holes 4a, 4b are formed by the frame member 45, and the frame member 45 is inserted through the outer skin material 44 into the frame-member installation hole 43a of the pad material 43. However, the present disclosure is not limited to this specific embodiment.

As seen in FIG. 6, the headrest 4A may have through holes 4Aa, 4Ab formed to extend through the pad material 43A in the horizontal direction and arranged in the vertical direction. In this instance, the outer surface of the pad material 43A and the inner walls of the through holes 4Aa, 4Ab are covered with the outer skin material 44A. As long as the headrest 4A has the through holes 4Aa, 4Ab, the frame member 45 (see FIG. 5) described in the above-described embodiment may not be provided.

In this modification, the pad material 43A has a through-hole formation opening 43Aa formed in the headrest 4A. The through-hole formation opening 43Aa is provided for the preparation of the through holes 4Aa, 4Ab. The through-hole formation opening 43Aa is formed to have a stepped configuration when viewed in transverse section such that the inner width at the opposite side that is opposite to the seating surface 5a (see FIG. 2) of the seat 1A is larger than the inner width at the seating surface 5a (see FIG. 2). The outer surface of the pad material 43A and the inner wall surface of the through-hole formation opening 43Aa are covered with the outer skin material 44A.

The through holes 4Aa, 4Ab of the headrest 4A are formed by the inner wall of the through-hole formation opening 43Aa of the pad material 43A that is covered with the outer skin material 44A. Similar to the through holes 4a, 4b (see FIG. 5) according to the above-described embodiment, the through holes 4Aa, 4Ab are formed such that the inner width d2 at the opposite side (outer side of the vehicle) that is opposite to the seating surface 5a (see FIG. 2) is larger than the inner width d1 at the seating surface 5a side (see FIG. 2; interior side of the vehicle) of the seat 1A.

As described above, the through holes 4Aa, 4Ab may consist of the through-hole formation opening 43Aa of the pad material 43A that is covered with the outer skin material 44A. The inner wall surfaces of the through holes 4Aa, 4Ab may have a stepped configuration when viewed in transverse section as long as the inner width d2 at the opposite side (outer side of the vehicle) that is opposite to the seating surface 5a (see FIG. 2) is larger than the inner width d1 at the seating surface 5a side (see FIG. 2; interior side of the vehicle) of the seat 1A.

<Other Modifications>

As seen in FIG. 1, a self-driving car has been described as an example of an automobile A in the above-described embodiment. However, the present disclosure is not limited to this specific embodiment. The automobile A is applicable to any kinds of vehicles as long as it is equipped with one seat 1 at least having a headrest 4. The automobile A may be a small-size vehicle equipped with one seat 1. As an alternative, the automobile A may be a bus equipped with a number of seats 1 or any other vehicle such as a one-box car and a two-box car.

Further, a six-seater car in which a pair of face-to-face type seats consisting of the front seat 1a and the rear seat 1b are arranged in the automobile A has been described as an example of the seat 1 in the above-described embodiment. However, the present disclosure is not limited to this specific embodiment. The arrangement or direction of the seat 1 is not limited to a face-to-face arrangement, and the seat 1 may be directed to other directions, where appropriate, such as frontward, rearward, or vehicle width direction.

Further, the front seat 1a and the rear seat 1b may be arranged face-to-face in the vehicle width direction. According to this configuration, when an occupant M seated on the front seat 1a and an occupant M seated on the rear seat 1b looks outside the vehicle through the through holes 4a, 4b of the headrest 4 directed to the vehicle width direction, the field of view of the occupant M can be extended in the vehicle width direction. Accordingly, the through holes 4a, 4b can improve the visibility outside the vehicle in the vehicle width direction.

The front seat 1a and the rear seat 1b (see FIG. 2) may be a seat for two occupants or a seat for more than two occupants. The number of headrests 4 provided on the front seat 1a and the rear seat 1b (see FIG. 2) may be determined properly in accordance with the number of occupants M to be seated on the seats.

What is claimed is:

1. A headrest disposed in an upper portion of a seat of a vehicle, the headrest comprising:
    a stay made of metal and comprising a held portion configured to be inserted into and fixed to a seat back of the seat, and a headrest frame portion constituting a framework of the headrest,
    a pad material,
    an outer skin material for covering an outer surface of the pad material, and
    a plurality of through holes arranged in a vertical direction, the through holes extending through the headrest in a horizontal and front-rear direction,
    wherein the through holes have a tapered shape such that a distance between sides in a vehicle width direction increases from a seating surface side of the seat toward an opposite side that is opposite to the seating surface side.

2. The headrest according to claim 1, wherein a width dimension of each of the through holes is larger at the opposite side than at the seating surface side.

3. The headrest according to claim 1, wherein a reinforcing member is provided between the through holes of the headrest.

4. A vehicle seat comprising a headrest according to claim 1, wherein the seat is a bench seat.

5. The vehicle seat according to claim 4, further comprising a plurality of headrests,
    wherein all of the plurality of headrests have a plurality of through holes arranged in the vertical direction, the through holes extending through the headrest in the horizontal and front-rear direction.

6. A vehicle seat comprising a headrest according to claim 1, wherein the seat is a pair of face-to-face type seats arranged opposite to each other.

7. A headrest disposed in an upper portion of a seat of a vehicle, the headrest comprising:
    a stay made of metal and comprising a held portion configured to be inserted into and fixed to a seat back of the seat, and a headrest frame portion constituting a framework of the headrest;
a pad material;
an outer skin material for covering an outer surface of the pad material;
a plurality of through holes arranged in a vertical direction, the through holes extending through the headrest in a horizontal and front-rear direction; and
a frame member inserted into and fixed to a central through-hole of the headrest,
wherein the plurality of through holes are formed in the frame member.

8. The headrest according to claim 7, further comprising a reinforcing member made of metal and horizontally extending in the headrest frame portion to connect inner side surfaces of the headrest frame portion,
wherein the frame member has a dividing portion between the plurality of through holes, and
wherein the reinforcing member is disposed in the dividing portion.

9. The headrest according to claim 7, wherein the frame member is made of synthetic resin.

10. The headrest according to claim 7, wherein a width dimension of each of the through holes is larger at an opposite side that is opposite to a seating surface side of the seat than at the seating surface side.

11. The headrest according to claim 7, wherein the through holes have a tapered shape such that a distance between sides in a vehicle width direction increases from a seating surface side of the seat toward an opposite side that is opposite to the seating surface side.

12. The headrest according to claim 7, wherein a reinforcing member is provided between the through holes of the headrest.

13. A vehicle seat comprising a headrest according to claim 7, wherein the seat is a bench seat.

14. The vehicle seat according to claim 13, further comprising a plurality of headrests,
wherein all of the plurality of headrests have a plurality of through holes arranged in the vertical direction, the through holes extending through the headrest in the horizontal and front-rear direction.

15. A vehicle seat comprising a headrest according to claim 7, wherein the seat is a pair of face-to-face type seats arranged opposite to each other.

* * * * *